Oct. 7, 1941.  S. SCHNELL  2,258,034
MASTER CYLINDER
Filed May 19, 1939  2 Sheets-Sheet 1
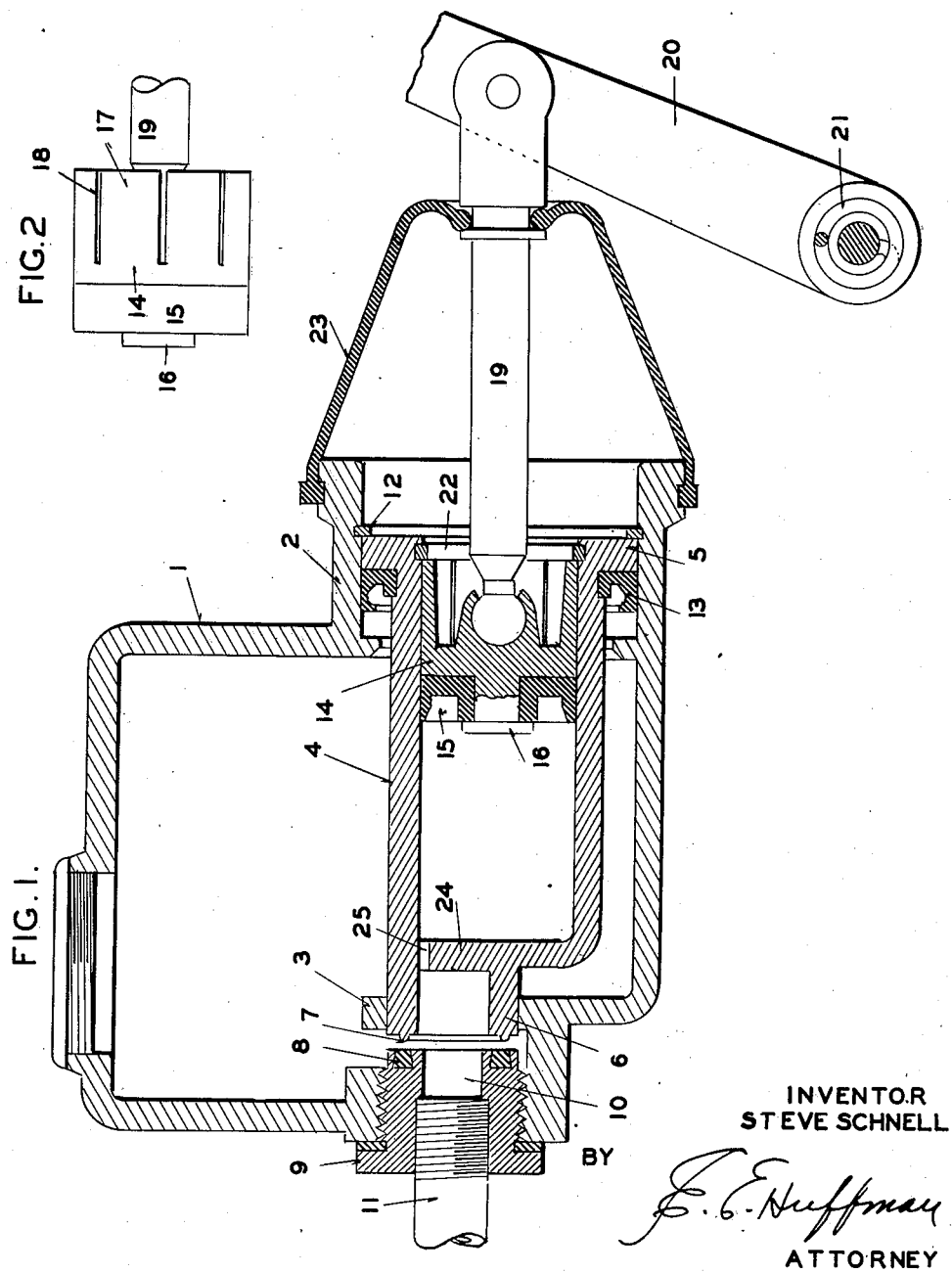
INVENTOR
STEVE SCHNELL
BY
ATTORNEY

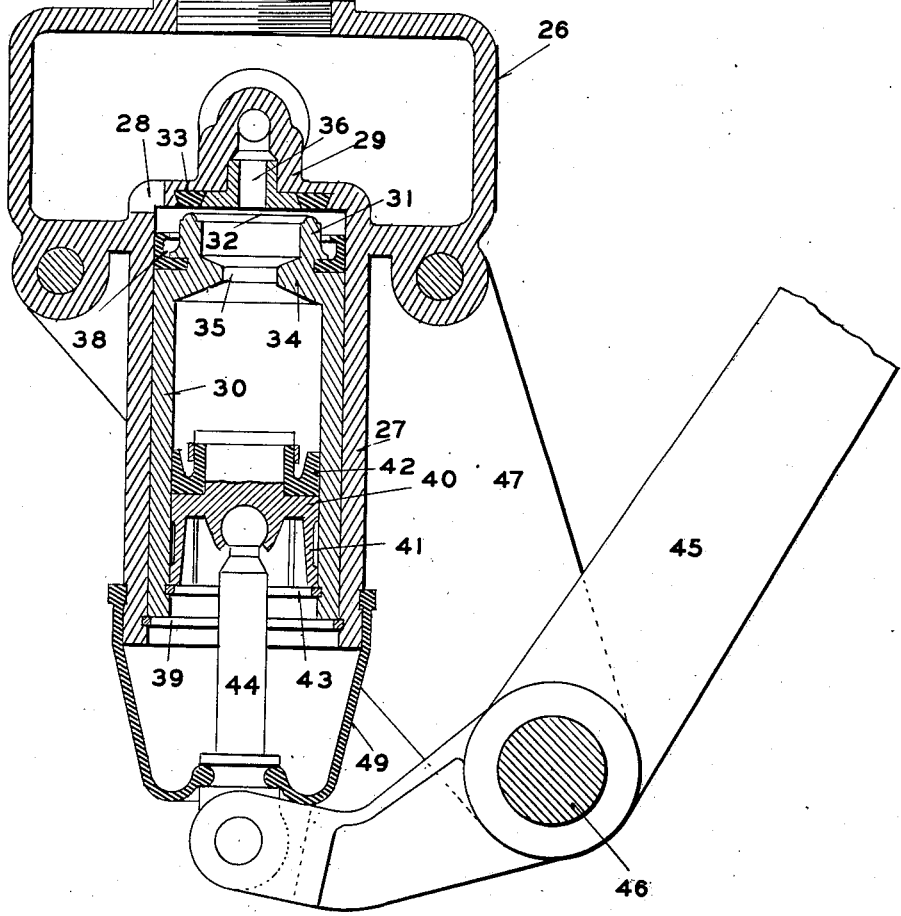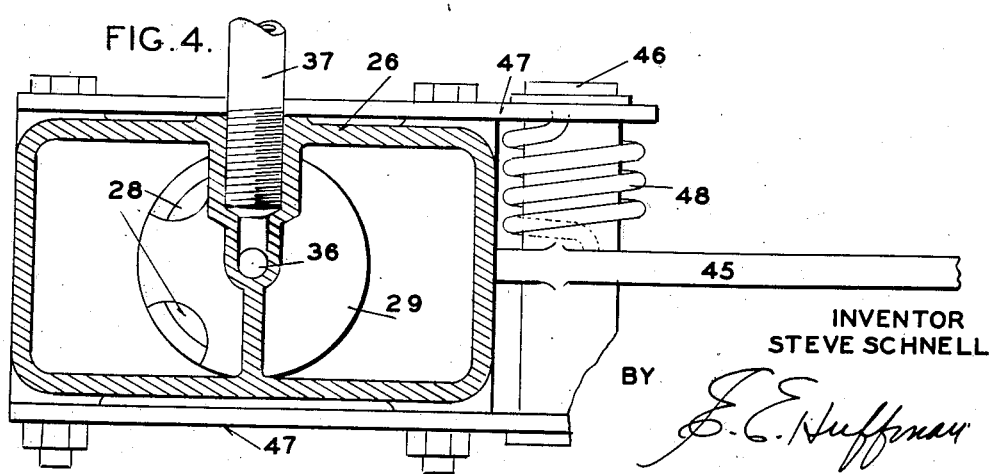

Patented Oct. 7, 1941

2,258,034

UNITED STATES PATENT OFFICE 2,258,034

MASTER CYLINDER

Steve Schnell, Overland, Mo., assignor to Wagner Electric Corporation, St. Louis, Mo., a corporation of Delaware Application May 19 1939, Serial No. 274,540

8 Claims. (Cl. 60—54.6)

My invention relates to master cylinders for fluid pressure systems whereby fluid in the system may be placed under pressure to operate a motor.

One of the objects of my invention is to produce a master cylinder device which has embodied therein improved means for permitting interchange of fluid between the system and a fluid reservoir to compensate for contraction and expansion when the piston thereof is in inoperative position and without the employment of a compensating porthole positioned in the cylinder just forwardly of the inoperative position of the piston.

Another and more specific object of my invention is to produce an improved master cylinder device for a fluid pressure system in which the cylinder thereof is mounted for axial reciprocable movement and so associated with the piston therein that the cylinder can be moved by the piston to control valve means for governing communication between the fluid system and a reservoir.

Other objects of my invention will become apparent from the following description taken in connection with the accompanying drawings in which Figure 1 is a cross-sectional view of a horizontal type of master cylinder device embodying my invention; Figure 2 is a side view of the piston and packing construction; Figure 3 is a cross-sectional view of a modified construction showing my invention embodied in a vertical type master cylinder device; and Figure 4 is a view taken on the line 4—4 of Figure 3.

Referring to Figures 1 and 2 in detail, numeral 1 indicates a reservoir housing adapted to be mounted on a suitable support and provided with a cylindrical portion 2 on its rear end and an integral upstanding bearing guide 3 in its bottom adjacent the forward end thereof. Within the lower part of the reservoir casing is a cylinder 4, the rear end of which has an integral annular flange 5 for cooperation with the cylindrical portion 2 and the forward end of which is formed with an eccentric cylindrical extension 6 mounted on the bearing guide 3. The cylindrical extension is formed with an annular rib 7 at its forward edge for cooperation with an annular rubber seat 8 carried by a plug 9 threaded in an opening in the end of the reservoir casing. The plug is provided with a passage 10 forming an outlet for the cylinder and secured to this plug is a conduit 11 leading to a suitable fluid motor for actuating any desired mechanism, as for example, the brake shoes of a vehicle brake. The cylindrical portion 2 carries a stop 12 for cooperation with a flange 5 whereby rearward movement of cylinder 4 is limited. When the flange engages this stop, the annular rib 7 will be disengaged from the seat 8 to thus establish an annular opening permitting free communication between the reservoir and both the interior of cylinder 4 and the system connected to passage 10. The cylinder adjacent flange 5 carries a suitable packing element 13 for preventing fluid from leaking out of the reservoir.

Reciprocable within cylinder 4 is a piston 14 carrying a packing cup 15 on a projecting portion 16. The skirt 17 of the piston is provided with longitudinal slots 18 to provide resilient portions frictionally engaging the inner surface of the cylinder. The piston is connected to a piston rod 19 by means of a ball and socket joint and a pedal 20 actuates the rod. A spring 21 biases the pedal and piston to their inoperative positions and rearward movement of the piston with respect to the cylinder is limited by a stop 22. There is also provided a dust excluding boot 23 for cooperation with the rear end of the cylindrical portion 2 and the piston rod 19 to exclude dust from the rear end of the cylindrical portion.

At the junction between the reduced eccentric cylindrical portion 6 and the cylinder there is provided a partition 24 at the top of which is a restricted opening 25 for placing the cylinder 4 in communication with the open end of the eccentric cylindrical portion 6 and the passage 10.

Referring to the operation, the parts, when in their inoperative positions, are as shown in Figure 1 and under these conditions any expansion or contraction of the fluid is freely permitted since the valve formed by rib 7 and seat 8 is open to the reservoir. When it is desired to place the fluid in the system connected with conduit 11 under pressure, piston 14 is moved forwardly by pedal 21. Because of friction between the skirt of the piston and the cylinder wall, initial movement of the piston will also cause movement of cylinder 4 in the same direction, thus bringing the annular rib 7 into engagement with the rubber seat 8 and closing off the system from the reservoir. Movement of cylinder 4 of the piston is also assisted by the differential pressures acting on partition 24 in the forward end of the cylinder. The portion of the partition which is subject to the fluid under pressure created in cylinder 4 is of greater area than the portion of the partition on the opposite side which is not subject to any pressure because of the open condition of the valve. The pressure of the fluid in the cylinder will be built up rapidly due to the restricted opening 25. After rib 7 has become seated and the valve closed, piston 14 will move relatively to cylinder 4 and create a pressure on the fluid in the cylinder and the entire system connected with conduit 11. Since the area of the partition exposed to fluid under pressure in cylinder 4 is greater than the area of the opposite side of the partition, there will always be a force acting in a direction to hold rib 7 in tight engagement with the rubber seat 8, thus insuring that this valve will be held closed. This force increases in proportion to the force created by the piston, thus insuring that the valve will remain closed.

When the piston 14 is retracted, the friction between the piston and the cylinder wall will result in the cylinder being moved rearwardly with the piston and rib 7 disengaged from the rubber seat 8, thereby connecting the system with the reservoir. When the piston returns to its position engaging stop 22, it will positively move cylinder 4 to its normal rearward position against stop 12 if the cylinder has not already assumed this position when the piston was initially moved rearwardly. During the rearward movement of the piston there is no danger of air being drawn in past the piston and the packing cup, since the reservoir will be in communication with the cylinder due to the open condition of the valve comprising rib 7 and seat 8. In the event the friction between the piston and the cylinder is not sufficient to move the cylinder in a rearward direction when the piston is initially moved rearwardly, the cylinder will, nevertheless, be moved rearwardly because of the drop in pressure of the fluid on the cylinder side of the partition 24 which causes a force to act in a direction to move the cylinder rearwardly.

From the above described structure it is apparent that I have produced a master cylinder device in which there is no compensating porthole positioned just ahead of the packing cup and which is uncovered by the packing cup when the piston is in retracted position. There results a structure which is more efficient and of a longer life. The rib 7 will always be seated against the rubber seat 8 regardless of the rate of deceleration of the piston. This is insured by the restricted opening 25. Thus if the piston is moved quickly to place the fluid under pressure, a force will be produced on the partition 24 by the fluid under pressure in the cylinder which will cause the cylinder to be moved forwardly and close the valve. If the movement of the piston is slow, the friction between the skirt and cylinder will move the cylinder to close the valve. Any air which may accumulate in cylinder 4 can easily escape to the reservoir as the opening 25 is at the top of the cylinder.

Referring to the modified construction shown in Figures 3 and 4, the master cylinder device is of the vertical type instead of the horizontal type as shown in Figure 1. The reservoir casing 26 is formed with an integral downwardly extending cylindrical portion 27 communicating with the reservoir by passages 28 in a partition 29 between the reservoir and the cylindrical portion. A cylinder 30 is mounted for limited reciprocable movement in the cylindrical portion 27 and this cylinder is provided with a reduced cylindrical extension 31 on its forward end which carries an annular rib 32 for cooperation with an annular rubber seat 33 carried by the partition 29. The cylindrical extension 31 and the cylinder are divided by a partition 34 through which is a connecting opening 35. The outlet from the cylinder comprises a passage 36 in partition 29 and this passage is connected to a conduit 37 leading to the fluid motor to be actuated. The forward end of the cylinder carries a packing element 38 for preventing leakage between cylinder 30 and the cylindrical extension 27. A stop 39 limits the downward movement of cylinder 30.

Within the cylinder is a piston 40 having a slotted skirt 41 to establish friction between the piston and the cylinder 30 and the head of the piston has associated therewith a packing cup 42. A stop 43 carried by cylinder 30 limits the relative movement between the cylinder and piston during the downward movement of the piston. The cylinder is reciprocated by a piston rod 44 which is actuated by a pedal 45 pivotally mounted on pin 46 carried by two downwardly extending plates 47 secured to the reservoir casing. A spring 48 biases the pedal and piston to their normally inoperative positions. A dust excluding boot 49 is associated with the end of the cylindrical portion 27 and the connecting rod 44.

The operation of the master cylinder device shown in Figures 3 and 4 is the same as shown in Figure 1. Initial upward movement of piston 42 will result in the cylinder 30 being carried therewith and rib 32 seated against rubber seat 33 to close off communication between the reservoir and both cylinder 30 and the system to which conduit 37 is connected. Since the area of partition 34 on the piston side is greater than the area of the partition on the opposite side, the valve comprising the rib 32 and seat 33 will be held closed by a force which is in proportion to the pressure being developed in cylinder 30. When piston 40 is retracted, rib 32 will be disengaged from seat 33 in a manner already described.

By having reservoir 26 mounted above the vertical cylindrical portion 27, any air which might get into cylinder 30 during operation of the master cylinder device can easily rise and escape into reservoir 26. With the vertical master cylinder construction shown, the extension 31 can be built concentric with the main cylinder 30. Also the reservoir space is held to a minimum.

Being aware of the possibility of other modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In fluid pressure apparatus, a support, a cylinder mounted on the support for limited reciprocable movement, means forming an outlet passage for the cylinder, a piston in said cylinder, a packing associated with the piston, means for normally positioning the piston at the rear of the cylinder and the cylinder at its rearward limit of movement, a reservoir, means comprising valve means controlled by the reciprocable movement of the cylinder for controlling communication between the reservoir and cylinder, and means independent of the packing for creating such friction between the piston and the cylinder that the cylinder will move to close the valve when the piston is moved forward, said cylinder being so formed that an area is present on which the fluid pressure created by the piston will produce a force tending to hold the valve means closed and which force will be proportional to the fluid pressure.

2. In fluid pressure apparatus, a support, a cylinder mounted on the support for limited reciprocable movement, said cylinder at its forward end having an outlet opening the cross-sectional area of which is less than the cross-sectional area of the cylinder proper, means forming a partition between the cylinder and the outlet opening and provided with a passage therethrough, a piston in said cylinder, means for normally positioning the piston at the rear of the cylinder and the cylinder at its rearward limit of movement, a reservoir, means forming an outlet passage for association with the outlet opening of the cylinder, and valve means associated with the outlet passage and the cylinder for controlling communication between the reservoir and both the cylinder and the outlet passage, said opening in the partition being of such size that it will restrict the flow of fluid under pressure from the cylinder when the piston is actuated and thus cause a force to be established which will move the cylinder forward to close the valve means.

3. In fluid pressure apparatus, a reservoir, a cylinder mounted in spaced bearings in the lower part of the reservoir for limited reciprocable movement, said cylinder being provided with an outlet opening of reduced cross-sectional area, an outlet passage aligned with the outlet of the cylinder, a valve element associated with the outlet passage, a cooperating valve element associated with the outlet opening of the cylinder, said valve elements controlling communication between the reservoir and both the cylinder and outlet passage, a packing cup associated with the piston, a piston in the cylinder, means for normally positioning the piston at the rear of the cylinder and the cylinder at its rearward limit of movement, and means independent of the packing cup for establishing friction between the piston and cylinder whereby the cylinder will be moved forward to engage the valve elements when the piston is initially moved.

4. In a fluid power transmitting system comprising a conduit for supplying fluid under pressure and a fluid reservoir, a fluid pressure producing device comprising a reciprocable cylinder and a reciprocable piston therein having a fluid outlet port in communication with the fluid supply conduit and said fluid supply conduit and cylinder port being normally in communication with the fluid reservoir, valve means controlled by the reciprocable movement of the cylinder, and means functioning when the piston moves forwardly for moving the cylinder forwardly to close the valve means and thereby prevent flow of fluid to the reservoir and when the piston initially moves rearwardly from a pressure producing position for moving the cylinder rearwardly to open the valve means and thereby permit flow of fluid from the reservoir whereby sub-atmospheric pressure may not be created in the cylinder during retractile movement of the piston, said means permitting relative movement between the piston and cylinder after the valve means is closed or after the valve means has been opened.

5. In a fluid power transmitting system comprising a conduit for supplying fluid under pressure and a fluid reservoir, a fluid pressure producing device comprising a reciprocable cylinder and a reciprocable piston therein having a fluid outlet port in communication with the fluid supply conduit and said fluid power conduit and cylinder port being normally in communication with the fluid reservoir, valve means controlled by the reciprocable movement of the cylinder, means functioning when the piston moves forwardly for moving the cylinder forwardly to close the valve means and thereby prevent flow of fluid to the reservoir and when the piston initially moves rearwardly to open the valve means and thereby permit flow of fluid from the reservoir whereby sub-atmospheric pressure may not be created in the cylinder during retractile movement of the piston, said means permitting relative movement between the piston and cylinder after the valve means is closed or after the valve means has been opened, and piston actuating means biased to "off" position and so connected to the piston as to cause the latter to move therewith in both directions.

6. In fluid pressure producing apparatus, a support, a cylinder mounted on the support for limited reciprocable movement, means forming an outlet passage for the cylinder, a piston reciprocable in the cylinder and normally in a retracted position, a reservoir, means including valve means governed by reciprocation of the cylinder for controlling all communication between the reservoir and the portion of the cylinder ahead of the piston, said valve means being closed by a forward movement of the cylinder and opened by a rearward movement of the cylinder, and means between the piston and cylinder and functioning when the piston moves forwardly for moving the cylinder forward to close the valve and when the piston initially moves rearwardly from a pressure producing position for moving the cylinder rearwardly to open the valve means.

7. In fluid pressure producing apparatus, a support, a cylinder mounted on the support for limited reciprocable movement, means forming an outlet passage for the cylinder, a piston reciprocable in the cylinder and normally in a retracted position, a reservoir, means including valve means governed by reciprocation of the cylinder for controlling all communication between the reservoir and the portion of the cylinder ahead of the piston, said valve means being closed by a forward movement of the cylinder and opened by a rearward movement of the cylinder, means functioning when the piston moves forwardly for moving the cylinder forward to close the valve means and when the piston initially moves rearwardly from a pressure producing position for moving the cylinder rearwardly to open the valve means, and means comprising an area on said cylinder for causing the fluid pressure being developed by the piston to apply a force to the cylinder and in a direction to cause the valve means to be held closed, said force being proportional to the fluid pressure being developed.

8. In fluid pressure producing apparatus, a support including a reservoir having a portion for mounting a cylinder, a cylinder mounted on said portion for limited reciprocable movement, means forming an outlet passage for the cylinder, a piston reciprocable in the cylinder, a seal for the piston, means including valve means governed by reciprocation of the cylinder for controlling all communication between the reservoir and the portion of the cylinder ahead of the piston, sealing means associated with the cylinder and the reservoir for preventing escape of fluid from the reservoir past the outer surface of the cylinder, and means operable by movement of the piston for controlling reciprocation of the cylinder and the opening and closing of the valve means, said cylinder moving forwardly to close the valve when the piston is moved forward and moving rearwardly when the piston is released for movement toward retracted position.

STEVE SCHNELL.